(12) United States Patent
Fritsch et al.

(10) Patent No.: US 10,864,065 B2
(45) Date of Patent: Dec. 15, 2020

(54) REFILL FOR ELECTRIC TOOTHBRUSH

(71) Applicant: Braun GmbH, Kronberg (DE)

(72) Inventors: Thomas Fritsch, Eppstein (DE); Irina Neusser, Kronberg (DE); Joern Utsch, Eschborn (DE)

(73) Assignee: Braun GmbH, Kronberg (DE)

( * ) Notice: Subject to any disclaimer, the term of this patent is extended or adjusted under 35 U.S.C. 154(b) by 246 days.

(21) Appl. No.: 16/015,922

(22) Filed: Jun. 22, 2018

(65) Prior Publication Data

US 2018/0368562 A1    Dec. 27, 2018

Related U.S. Application Data

(60) Provisional application No. 62/525,657, filed on Jun. 27, 2017.

(51) Int. Cl.
*A61C 17/22* (2006.01)
*A61C 17/34* (2006.01)

(52) U.S. Cl.
CPC ........ *A61C 17/222* (2013.01); *A61C 17/3436* (2013.01)

(58) Field of Classification Search
CPC ....... A61C 17/22; A61C 17/222; A61C 17/24; A61C 17/26; A61C 17/32; A61C 17/34; A61C 17/3409; A61C 17/3418; A61C 17/3427; A61C 17/3436; A61C 17/3445; A61C 17/3454; A61C 17/3463; A61C 17/40

See application file for complete search history.

(56) References Cited

U.S. PATENT DOCUMENTS

| 3,088,148 A | * | 5/1963 | Moret | A61C 17/32 |
| | | | | 15/22.1 |
| 3,400,417 A | | 9/1968 | Moret | |
| 4,017,934 A | | 4/1977 | Callahan | |
| 4,827,552 A | * | 5/1989 | Bojar | A61C 17/222 |
| | | | | 15/28 |
| 6,836,917 B2 | | 1/2005 | Blaustein et al. | |
| 6,952,855 B2 | | 10/2005 | Lev et al. | |
| 8,631,532 B2 | | 1/2014 | Schaefer et al. | |
| 8,671,492 B2 | | 3/2014 | Kresner | |
| 9,237,943 B2 | | 1/2016 | Graeve | |

(Continued)

FOREIGN PATENT DOCUMENTS

| CH | 391652 | * 5/1965 |
| DE | 2527130 | 1/1976 |
| DE | 2633848 | 4/1977 |

(Continued)

*Primary Examiner* — Mark Spisich
(74) *Attorney, Agent, or Firm* — Vladimir Vitenberg

(57) ABSTRACT

A refill for an electric toothbrush comprises a generally tubular structure formed by refill walls defining an interior space for accepting thereinto a coupling stem of a toothbrush handle. The refill includes a motion transmitter functionally connected to the brush head for driving it. The refill has a coupling device including a pair of mutually opposite and resiliently deformable cantilevered arms disposed in the interior space of the refill and adjacent to the refill walls. Each of the arms terminates with a coupling surface for engaging a coupling pin extending from the handle's coupling stem for secure and disengageable connection therewith.

23 Claims, 12 Drawing Sheets

(56) References Cited

U.S. PATENT DOCUMENTS

2014/0130274 A1   5/2014  Fattori
2014/0341636 A1   11/2014 Fattori

FOREIGN PATENT DOCUMENTS

| DE | 19508932   | * | 9/1996  |
| DE | 10209320   |   | 9/2003  |
| EP | 488971     | * | 6/1992  |
| EP | 0500537    |   | 9/1992  |
| EP | 2913026    |   | 9/2015  |
| FR | 2476994    | * | 9/1981  |
| WO | WO0076420  |   | 12/2000 |
| WO | 2014/071083 | * | 5/2014  |

* cited by examiner

REFILL FOR ELECTRIC TOOTHBRUSH

RELATED APPLICATION INFORMATION

This application claims priority to provisional application Ser. No. 62/525,657, filed on Jun. 27, 2017, which provisional application is incorporated herein by reference.

FIELD OF THE INVENTION

The present disclosure is directed to an electric toothbrush, and more particularly to a coupling arrangement between the toothbrush's handle and an attachment part, or refill, wherein the refill having a functional brush head is connected to a toothbrush handle comprising a drive shaft for driving the brush head.

BACKGROUND

Electric toothbrushes generally have removable and exchangeable attachment brushes, also known as "refills," so that a common handle can be used by multiple family members, each family member having a separate personal refill. Also, when the brush head is worn out and/or otherwise needs to be replaced, only a refill—as opposed to the entire electric toothbrush including the handle—needs to be replaced.

During brushing, various forces must be transmitted by the coupling between the refill and the handle during operation of the brush. These forces include in particular the cleaning forces, drive forces, axial forces, and radial forces, which act on the refill and/or the handle. The coupling of the refill to the handle is generally achieved in such a way that the radial forces are absorbed or dissipated in the handle, while the axial forces are absorbed or dissipated in the drive shaft. For this purpose, the tubular connecting piece of the refill is generally pushed onto the coupling stem, or neck, of the toothbrush, and the drive shaft, provided in the brush tube of the refill, is coupled to the drive shaft that protrudes from the end of the handle's coupling stem.

An example of such a system is described in EP 0500537 B1, according to which the handle neck, and, in a correspondingly complementary fashion, the tubular connecting piece, are provided with a cross-section that deviates from a circular shape to enable radial forces to be better absorbed. In order to enable transmission of the axial forces, the drive shaft in the brush tube can be pushed onto the drive shaft on the handle and secured there by a latching connection.

WO 00/76420A1 proposes that the axial fixing and also the fixing against rotation be achieved at the handle neck. For these purposes, saw-tooth-shaped rubber lips are provided in the tubular connecting piece of the attachment brush, which lips can be pushed onto the handle neck, the shape of which deviates from a circular shape. In addition, latching tongues are provided on the tubular connecting piece that can be pushed over the outer circumferential surface of the handle neck and can be latched there; this is intended to achieve additional securing against a pulling off in the axial direction. However, the additional axial securing achieved by this latching device is limited due to the outer circumference of the handle neck becoming dirty, for example with toothpaste residue and the like. In addition, the neck of the toothbrush is sometimes grasped with the fingers, which can cause unintentional disengagement due to external pressure on the latching connection.

U.S. Pat. No. 6,836,917 proposes an electric toothbrush that has an L-shaped groove on the neck of the toothbrush, into which a pin provided on the push-on connecting piece of the attachment brush moves, such that the attachment brush can be secured by pushing it on and rotating it, in the style of a bayonet coupling. In addition, provision is made for an engaging of the drive shafts. However, radial forces can cause unintentional disengagement of the bayonet coupling if these forces are applied in the correct (so to speak) direction of rotation relative to the handle, thus making additional securing measures necessary.

DE 10209320A1 discloses an electric toothbrush in which only a toothbrush head can be exchangeably latched to the handle; i.e., the toothbrush head does not have a drive shaft for driving same. Instead, a drive shaft on the handle must be threaded into the toothbrush head, which can sometimes pose problems and requires a particular drive movement of the drive shaft.

U.S. Pat. No. 8,671,492 discloses an attachment part for an electric toothbrush wherein the connecting piece has at least one interior latching element arranged to move into the interior of the neck of the handle and to create a disengageable connection of the attachment part to the neck of the handle. The interior latching element is radially inwardly offset, with regard to the diameter thereof, relative to an internal cylindrical surface of the connecting piece. A gap between the exterior of the interior latching element and the internal cylindrical surface allows a wall of the neck of the handle to be moved into it.

US 2014/0130274A1 discloses a structure for coupling the refill head to a toothbrush handle that ensures proper alignment and simplifies the loading and unloading of the refill head to the handle. In one embodiment, the refill head comprises a tubular sleeve forming a cavity and first and second upper cam surfaces that form shoulders within the cavity. The first and second upper cam surfaces are separated by first and second axial slots of different configurations that prevent loading of the refill head onto the oral care implement handle in an improper rotational orientation through interaction with first and second bosses on the oral care implement handle.

US 2014/0341636A1 (EP2913026A1) discloses a refill head (100), and oral care implement incorporating the same, wherein the refill head (100) can be uncoupled from a stem (220) of a handle (200) by withdrawing the refill head (100) from the stem of a handle (200) along the longitudinal axis of the oral care implement, which results in locking members (134) on the refill head (100) disengaging from an engagement rib (230) on the stem (220). The locking members (134) and engagement rib (230) may be aligned with or angled relative to the longitudinal axis of the oral care implement. A portion of the stem may be visible through a portion of the refill head to reinforce the proper connection between the refill head and the handle.

Other references disclosing various techniques for and ways of coupling the refill to the handle of an electric toothbrush include: U.S. Pat. No. 4,017,934; DE2527130A1; DE2633848A1; U.S. Pat. Nos. 6,952,855; 3,400,417; and 9,237,943.

The present disclosure provides a further improved electric toothbrush, an improved refill, an improved handle; and an improved handle-refill coupling mechanism for such an electric toothbrush, wherein an easy-to-operate coupling is formed between the refill and the handle that holds the refill firmly and with as little play as possible on the handle, and still permits an easy coupling, including engagement and disengagement, between the handle and the refill.

SUMMARY OF THE DISCLOSURE

In one aspect, the disclosure is directed to an electric toothbrush having a longitudinal direction or axis and comprising a handle and a refill structured and configured to be attached to the handle via a coupling device. The handle has a drive mechanism, and the refill has a brush head and a motion transmitter functionally connected to the brush head for driving the brush head. The handle further comprises a coupling stem having outer walls extending in a direction parallel to the longitudinal axis and terminating with a free end; and the coupling stem has a coupling pin extending therefrom in a direction not parallel to the longitudinal axis. The refill has a generally tubular portion formed by refill walls defining an interior space, which is structured and configured to accept therein the coupling stem of the handle when the refill is attached to the handle. The coupling device comprises a pair of mutually opposite cantilevered arms disposed in the interior space of the refill and adjacent to the refill walls, each of the arms terminating with a coupling surface structured and configured to engage the coupling pin for secure and disengageable connection therewith.

In another aspect, the disclosure is directed to a refill for an electric toothbrush having a longitudinal axis. The refill, structured and configured to be attached to a handle of the electrical toothbrush, has a movable brush head and comprises a generally tubular structure formed by refill walls defining an interior space that is structured and configured to accept therein a coupling stem of the handle. The refill includes a motions transmitter functionally connected to the brush head for driving the brush head. The refill includes a coupling device comprising a pair of mutually opposite cantilevered arms disposed in the interior space of the refill and adjacent to the refill walls, each of the arms terminating with a coupling surface structured and configured to engage a coupling pin extending from the coupling stem of the handle for secure and disengageable connection therewith.

In still another aspect, the disclosure is directed to a coupling mechanism for an electric toothbrush having a longitudinal axis and comprising a handle and a replaceable refill. The coupling mechanism comprises a handle coupling portion and a refill coupling portion that are structured and configured to engage one another, thereby providing a secure connection between the handle and the refill. The handle coupling portion comprises a coupling stem disposed at one end of the handle in the longitudinal axis and a pin protruding from the stem in a direction not parallel to the longitudinal axis, the coupling stem having outer walls terminating at a free end thereof. The refill coupling portion comprises a generally tubular structure having refill walls and an interior space therebetween structured and configured to receive therein the coupling stem of the handle coupling portion, and a pair of mutually opposite cantilevered arms disposed in the interior space, each of the arms terminating with a coupling surface structured and configured to engage the coupling pin of the handle coupling portion for secure and disengageable connection therewith.

In one embodiment, the coupling pin extends in a direction substantially perpendicular to the longitudinal axis and/or a direction substantially perpendicular to the outer walls of the coupling stem. The coupling stem may beneficially include a rib oriented in the longitudinal axis and having a first (lower) end and a second (upper) end opposite to the first end. The rib can be disposed adjacent to the pin. In one embodiment, the pin is disposed between or intermediate the first end and the second end of the rib. The refill may comprise a groove structured and configured to engage the upper end of the rib of the coupling stem, to restrict axial movement of the refill relative to the handle when the refill is being axially attached to the handle.

Each of the two mutually opposite cantilevered arms terminates with a coupling surface. More specifically, a first cantilevered arm terminates with a first coupling surface and a second cantilevered arm terminates with a second coupling surface. The first coupling surface is opposite to and faces the first coupling surface. The first and second coupling surfaces are structured and configured to simultaneously embrace the coupling pin at opposite sides thereof when the refill is attached to the handle. Each of the coupling surfaces comprises a slide portion and a clamp portion adjacent to the slide portion. A distance between the mutually opposite slide portions of the first and second coupling surfaces can be from about 0.4 mm to about 5 mm, from about 0.5 mm to about 4.5 mm, from about 0.6 mm to about 3 mm, and specifically from about 1 mm to about 2 mm. The pin's diameter (or an equivalent dimension orthogonal to the slide portions if the pin is not cylindrical) can be from about 0.8 mm to about 6 mm, from about 1 mm to about 5 mm, and from about 2 mm to about 4 mm. The pin may have a cross-section of any suitable shape, including, e.g., a shape comprising round, oval, rectangular, trapezoidal, rectangular, pentagonal, hexagonal, and any other suitable polygonal shape or any portion thereof.

The coupling surfaces are structured and configured to slidably and resiliently engage the coupling pin when the refill is being axially attached to the handle, i.e., when the refill is being axially moved relative to the handle and the pin arranged thereon. During attachment, the mutually opposite slide portions of the coupling surfaces slide downwardly in resilient contact with the pin. When the pin reaches the clamp portion, the pin is pulled into a snap fit with the coupling surfaces inside the clamp portion. To facilitate the pin's entry into the space between the two coupling surfaces, each of the slide portions may include a chamfer.

The slide portions of the first and second coupling surfaces can be arranged substantially parallel to the longitudinal axis (and hence parallel to one another). Alternatively, at least one of slide portions can be angled relative to the longitudinal axis. An included angle between the slide portions can be from about 0.1 degree to about 20 degrees, from about 1 degree to about 15 degrees, from about 1.5 degrees to about 10 degrees, and specifically from about 2 degrees to about 3 degrees. In one embodiment, each of the slide portions are symmetrically angled relative to the longitudinal axis such that the space between the mutually opposite slide surfaces increases upwardly, i.e., from the chamfers to the clamp portion. Such a configuration facilitates pulling of the pin into the clamp portion of the coupling surfaces, due to the resilience of the cantilevered arms and associated pressure of the coupling surfaces acting on the pin as the pin slides along the slide surfaces.

As the refill is being attached to the handle, a space or clearance existing between the two mutually opposite coupling surfaces of the cantilevered arms resiliently expands—as the pin slides along the opposite slide portions of the coupling surfaces. When this happens, the elastic (or resilient) deformation or movement of the cantilevered arms may include a radial-bending elastic deformation, i.e., a resilient movement of the arms away from the toothbrush's longitudinal axis; an axial-bending elastic deformation, i.e., a resilient movement of the arms along the toothbrush's longitudinal axis; a torsion-twisting elastic deformation, i.e., a resilient torque movement of the cantilevered arm wherein the coupling surface rotates relative to the arm's portion adjacent to its "hinge" or "root" (from which the arm extends); and any combination thereof.

Because of repeated attachments of the refill to and dis-attachments of the refill from the handle, there is an inevitable wear at the interface of the pin and coupling surfaces, particularly in an environment containing abrasive material such as toothpaste slurry. It is therefore beneficial to have the pin (which is part of the handle) made of a material having a hard surface, such, e.g., as steel, ceramics, reinforced plastic, as well as hard-surface-coated materials. The coupling surfaces (which are part of the refill) can be made of plastic. Such an arrangement beneficially meets the requirements of functionality over respective expected lifetimes of the handle and the refill.

The pin may have any suitable shape, e.g., cylindrical or prismatic, although the cylindrical shape is preferred. Correspondingly, the clamp portions of the coupling surfaces can also be profiled to have a circular or semi-circular shape, wherein a diameter of the pin is substantially equal to an equivalent diameter of the clamp portion. In such an arrangement, the entire surface of the clamp portion is in contact with the side surface of the coupling pin. In one exemplary embodiment, the clamp portion of each of the first and second coupling surfaces is structured and configured to abut a side surface of the coupling pin such that substantially an entire surface of the clamp portion is in contact with the side surface of the coupling pin. In other words, the respective surfaces of the pin and the clamp portions can be structured and configured such that virtually the entire clamp portion of each of the coupling surfaces (or its major portion, that is more than about 50% of the relevant surface) is in contact with the corresponding surface of the pin. In another embodiment, the pin may be cylindrical, but the coupling surface may be non-cylindrical, e.g., oval or polygonal. In the latter instance, the contact surfaces of the clamp portion will only partially abut the cylindrical pin. The coupling surfaces, including the clamp surfaces, can be configured to influence and/or control the insertion and extraction forces needed to be applied when the refill is being attached to the handle.

The refill, and the coupling mechanism, can be structured to comprise a coupling insert disposed inside the tubular portion of the refill and fit-pressed thereto. The insert has a front portion comprising an upper section, a lower section, and a middle section between the upper and lower sections, wherein the lower section is separated from the middle section by a first semi-circular space and the middle section is separated from the upper section by a second semi-circular space. The lower section may comprise an annular flange extending in a direction substantially perpendicular to the longitudinal axis and comprising an inner perimeter and an outer perimeter. When the refill is attached to the handle, the annular flange can be positioned adjacent to the handle. The inner perimeter of the flange may beneficially include a recess structured and configured to provide a space for the rib of the coupling stem when the refill is being attached to the handle.

The middle section comprises the pair of mutually opposite cantilevered arms, previously described. The cantilevered arms are positioned such that they can resiliently move, as previously described, relative to the lower section and the upper section. The upper section may include the groove, previously described, for engaging the upper end of the rib longitudinally extending from the coupling stem, to restrict axial movement of the refill relative to the handle when the refill is being axially attached to the handle.

In one embodiment, the outer walls of the coupling stem and the refill walls form, in combination, a plurality of press-fit segments wherein opposite faces thereof frictionally engage one another when the refill is attached to the handle. The press-fit areas can be provided at any suitable location, e.g., adjacent to the free end of the coupling stem and/or adjacent to an end opposite to the free end of the coupling stem. Each of the press-fit areas can have at least two press-fit segments, i.e., points of frictional contact. In one embodiment, the plurality of press-fit segments comprises three press-fit adjacent to the free end of the coupling stem and at least three press-fit segments adjacent to the end opposite to the free end of the coupling stem.

In one embodiment, the coupling insert comprises at least one tolerance-compensation spring extending upright in a general direction substantially parallel to the longitudinal axis and having a free end. The tolerance-compensation spring can be structured and configured so that when the refill is attached to the handle, at least a portion of the tolerance-compensation spring adjacent to its free end resiliently biases the insert against the surface of the coupling stem, thereby providing a frictional connection therebetween.

In a further embodiment, each of the cantilevered arms may comprise a curved portion and a vertical fin integrally formed with the curved portion, wherein the fin includes the coupling surface, previously described. The curved portion has a curvature length measured in a circumferential direction, a curvature height measured in a direction generally perpendicular to the curvature length, and a curvature thickness measured in a direction generally perpendicular to the curvature height. In one embodiment, the curvature length is greater than the curvature height and the curvature height is greater than the curvature thickness. In one embodiment, the vertical fin has a fin height that is greater than the curvature height. The curvature length can be from about 4 mm to about 10 mm, from about 4.5 mm to about 9 mm, and from about 5 mm to about 8 mm. The curvature height can be from about 2 mm to about 8 mm, from about 2.5 mm to about 6.5 mm, and from about 3 to about 5 mm. The curvature thickness can be from about 0.5 mm to about 2 mm, from about 0.7 mm to about 1.8 mm, and from about 0.9 mm to about 1.6 mm. The fin height can be from about 3 mm to about 12 mm, from about 5 mm to about 10 mm, and from about 6 mm to about 9 mm.

In one embodiment of the toothbrush and the refill, the refill may have a motion transmitter that terminates with a first magnetic coupling element, while the drive mechanism of the handle terminates with a second magnetic coupling element. Then, the first magnetic coupling element and the second magnetic coupling element can be structured and configured to form a secure magnetic connection therebetween when the refill is attached to the handle, so that the movement of the handle's drive mechanism is transmitted to the refill's motion transmitter. Such magnetic coupling elements may include permanent magnet or magnets and/or a magnetizable element or elements.

The drive mechanism of the handle can be designed for a linear oscillatory movement substantially along the longitudinal axis A, while the brush head can be designed for a rotational oscillatory motion around a rotation axis extending substantially perpendicular to the longitudinal axis A. Alternatively or additionally, the brush head can be designed to move in a lateral oscillatory motion around an axis extending substantially parallel to the longitudinal axis A, or any other type of movement, such as, e.g., a linear oscillatory movement, a vibratory action, and/or other movement patterns, as is known in the art.

BRIEF DESCRIPTION OF THE DRAWINGS

The embodiments set forth in the drawings are schematic and illustrative in nature, and not intended to limit the invention defined by the claims. The following detailed description of the illustrative embodiments can be better understood when read in conjunction with the following drawings, in which like structures are indicated with like reference numerals.

DETAILED DESCRIPTION

Figures 1, 2, 3:
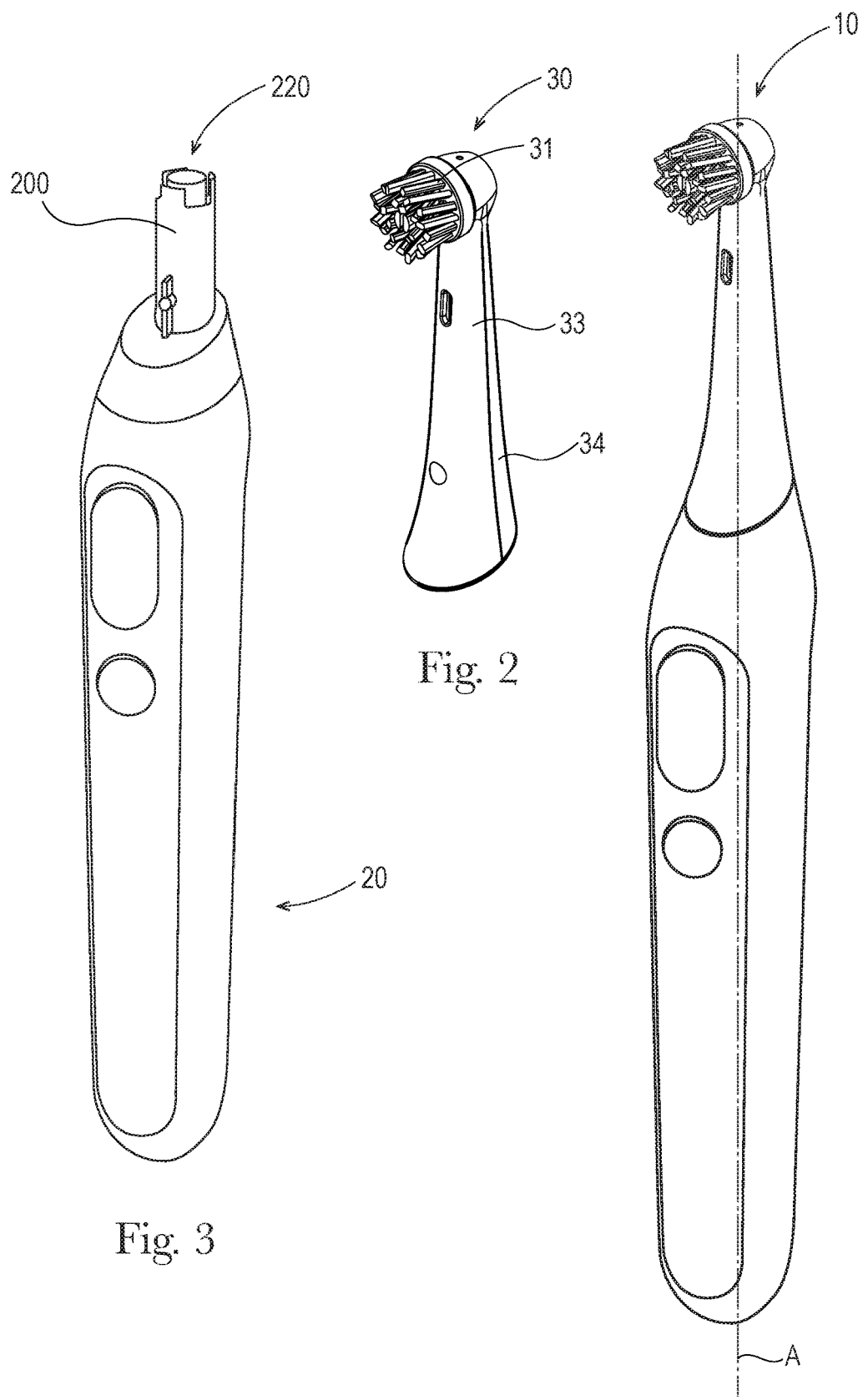
FIG. 1 is a schematic axonometric view of an embodiment of an electric toothbrush.
FIG. 2 is a schematic axonometric view of a refill of the toothbrush shown on FIG. 1.
FIG. 3 is a schematic axonometric view of a handle of the toothbrush shown on FIG. 1.

As is shown in FIGS. 1-3, an electric toothbrush 10 of the disclosure comprises a handle 20 and a refill 30 having a longitudinal axis or longitudinal direction A. In the embodiment of FIG. 1 the longitudinal axis A of the refill 30 coincides with that of the handle 20, but one skilled in the art will appreciate that in some embodiments (not shown here) the refill can be designed to be slightly angled relative to the handle, in which instances the longitudinal axis of the refill may not coincide with or be parallel to the that of the handle. Such an angled embodiment is included in the scope of the invention.

Figure 12:
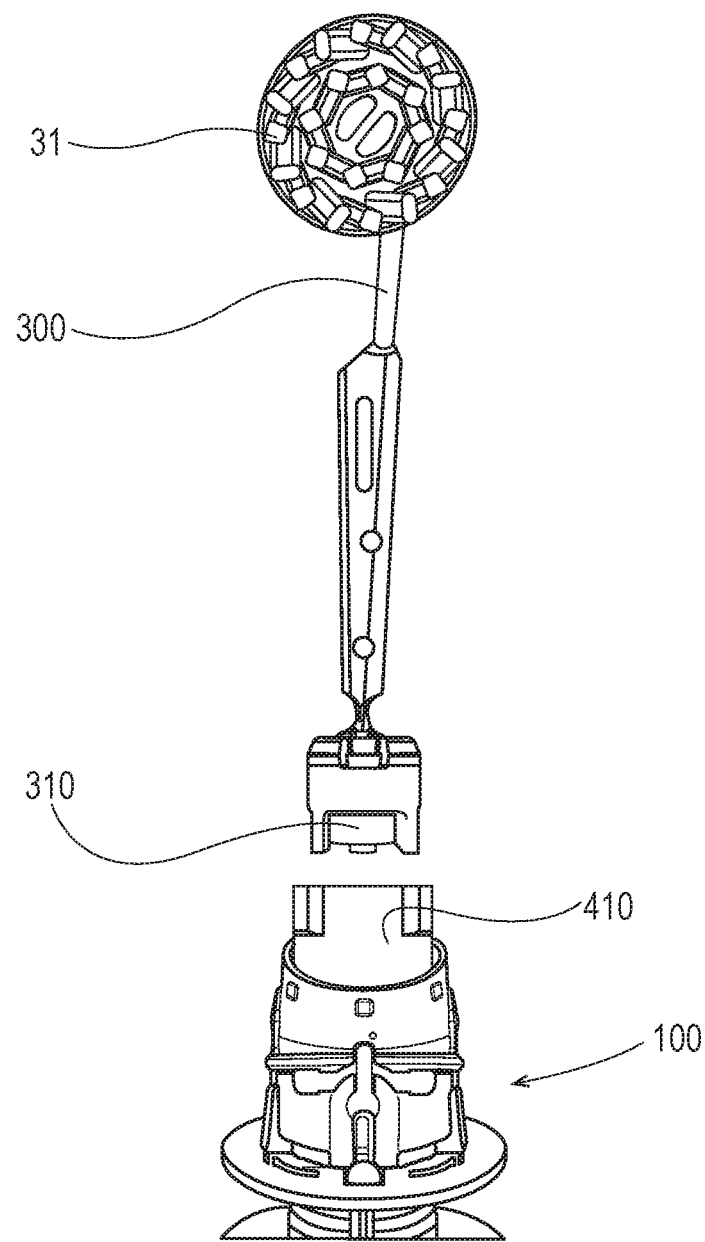
FIG. 12 is a schematic view of an embodiment of a refill, without its outer shell, and a portion of a handle, showing a motion transmitter and magnetic coupling elements.

The refill 30 is structured and configured to be attached to the handle 20 via a coupling device 100, FIGS. 4-7. The handle 20 has a drive mechanism (not shown) inside, and the refill 30 has a brush head 31 and a motion transmitter 300 (FIGS. 7, 12) functionally connected to the brush head 31 for driving the brush head 31. The handle 20 further comprises a coupling stem 200 having outer walls 210 extending in the longitudinal axis A and terminating with a free end 220. The coupling stem 200 has a coupling pin 230 extending therefrom in a direction not parallel to the longitudinal axis A. Preferably, the coupling pin 230 extends from the coupling wall 210 at an approximately right angle, or substantially perpendicular relative to the longitudinal axis A.

Figure 4:
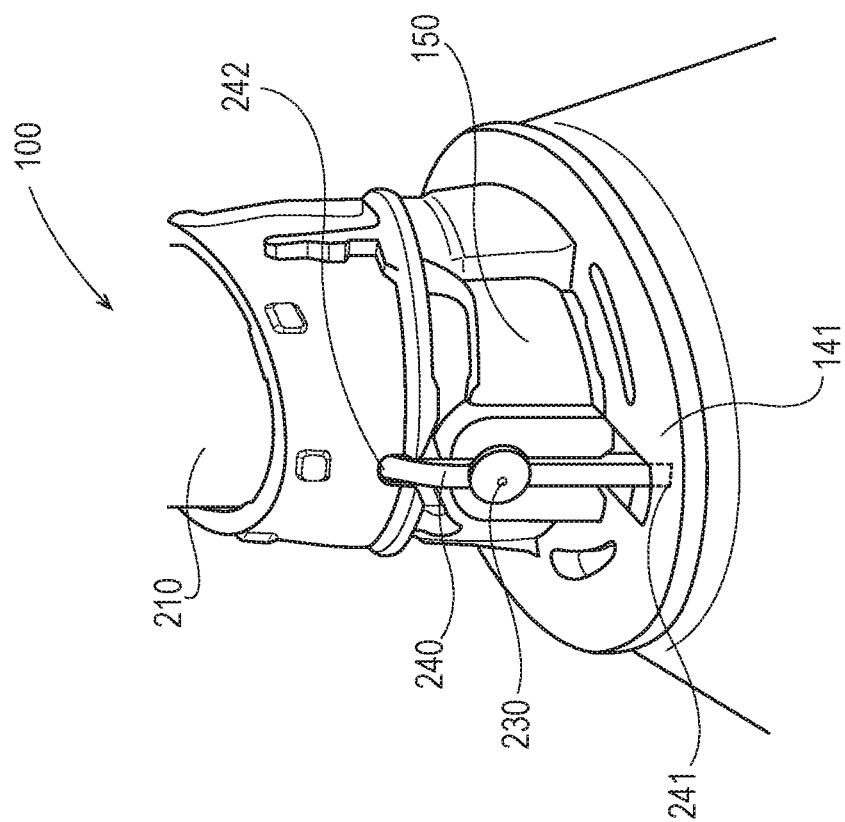
FIG. 4 is a schematic front view of an embodiment of a coupling device of the disclosure.
Figure 5:
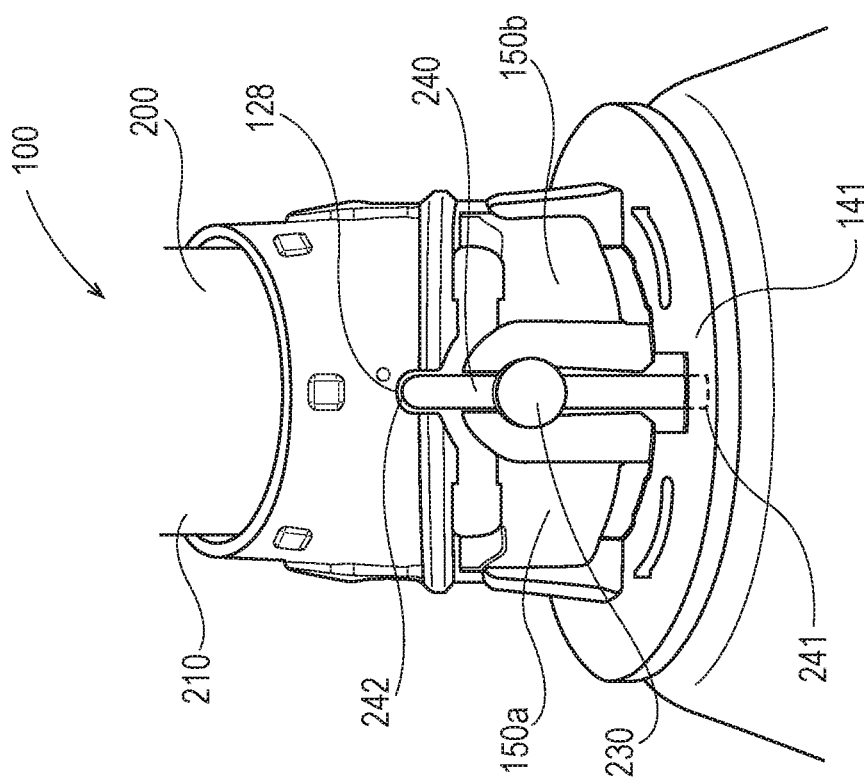
FIG. 5 is a schematic axonometric view of an embodiment of a coupling device shown in FIG. 4.

The coupling stem 200 may beneficially include a coupling rib 240 outwardly (or radially) protruding from the stem 200 and longitudinally oriented in a direction generally parallel to the longitudinal axis A. The rib 240 has a first (lower in the figures) end 241 and a second (upper) end 242 opposite to the first end 241. The rib 240 can be disposed adjacent to the pin 230. In the embodiment of FIGS. 4 and 5, the coupling pin 230 is disposed between or intermediate the first end 241 and the second end 242 of the rib 240. The rib 240 and the coupling pin 230 may be constructed to outwardly protrude from the stem 200 to the same extent, i.e., an outmost outer surface of the rib 240 can be flush with an outmost outer surface (free end) of the coupling pin 230. Alternatively, the coupling pin 230 can protrude from the coupling stem 200 to a greater extent that the rib 240 does, in which instance a portion of the coupling pin 230 extends beyond the outmost outer surface of the rib 240 (FIGS. 4, 5).

The refill 30 may comprise a groove 128 structured and configured to engage the second end 242 of the rib 240, to restrict a movement (axial and/or radial) of the refill 30 relative to the handle 20 when the refill 30 is being axially attached to the handle 20. The groove 128 can be beneficially sized and shaped to match the size and shape of the second end 242 of the rib 240. In an embodiment of FIGS. 4 and 5, the second end 242 of the rib 240 is shown to have a convex, generally semi-circular shape; and the grove 128 is shown to have a corresponding concave, generally semi-circular shape. Other mutually corresponding shapes of the rib 240 and the groove 128 are contemplated by the disclosure. Also, the second end 242 of the rib 240 can have other suitable configurations, which may or may not have to transition in a tangential manner.

The refill 30 has a generally tubular portion 33 formed by refill walls 34. The tubular portion 33 can have any suitable shape, including, e.g., a generally cylindrical shape, a generally conical shape, or any combination thereof. As used herein, the terms "generally cylindrical" and "generally conical" describe shapes strictly cylindrical and conical and those deviating from strictly cylindrical and conical shapes. Examples of such "generally cylindrical" and "generally conical" tubular portion 33 include, without limitation, the tubular portion 33 having a cross-sectional shape deviating from circular by being elongated in one direction, e.g., elliptical, oval, and the like. The tubular portion can have other suitable shapes as well, e.g., polygonal, rectangular, and so on—or a combination of generally cylindrical/conical and polygonal shapes. Inside the tubular portion 33, there is an interior space, defined by the refill's walls 34 and structured and configured to accept therein the coupling stem 200 of the handle 20 when the refill 30 is attached to the handle 20. The coupling device 100 comprises a pair of mutually opposite cantilevered arms 150 disposed in the interior space of the refill 30 and adjacent to the refill walls 34, and more specifically adjacent to the interior surfaces of the refill walls 34. The cantilevered arms 150 are curved and can be described as generally circular or semi-circular, which means that a cross-sectional shape of the arms 150, taken in a plane substantially perpendicular to the longitudinal axis A, can comprise portions that are circular or can comprise portions that deviate from an ideal circular shape—similarly to the deviation of the previously described generally cylindrical and generally conical tubular portion 33, i.e., by being elongated in one direction, to comprise, e.g., a portion of an elliptical, oval, and the like shape.

A pair of the curved cantilevered arms 150 comprises a first arm 150a and a second arm 150b opposite to the first arm 150a. Each of the cantilevered arms 150 has its fixed end (or "root") 151 (151a, 151b) and terminates with a free end 152 (152a, 152b). The free end 152 includes a coupling surface 153 (153a, 153b) structured and configured to engage the coupling pin 230 of the coupling stem 200 for secure and disengageable connection therewith. In a coupling mechanism of the disclosure, the coupling pin 230 forms a handle coupling portion, and the coupling device 100 forms a refill coupling portion.

A first cantilevered arm 150a terminates with a first coupling surface 153a, and a second cantilevered arm 150b terminates with a second coupling surface 153b. The first coupling surface 153a is opposite to and faces the second coupling surface 153b. The first and second coupling surfaces 153a, 153b are structured and configured to simultaneously embrace the coupling pin 230 at its opposite sides when the refill 30 is being attached to the handle 20.

Figure 8:
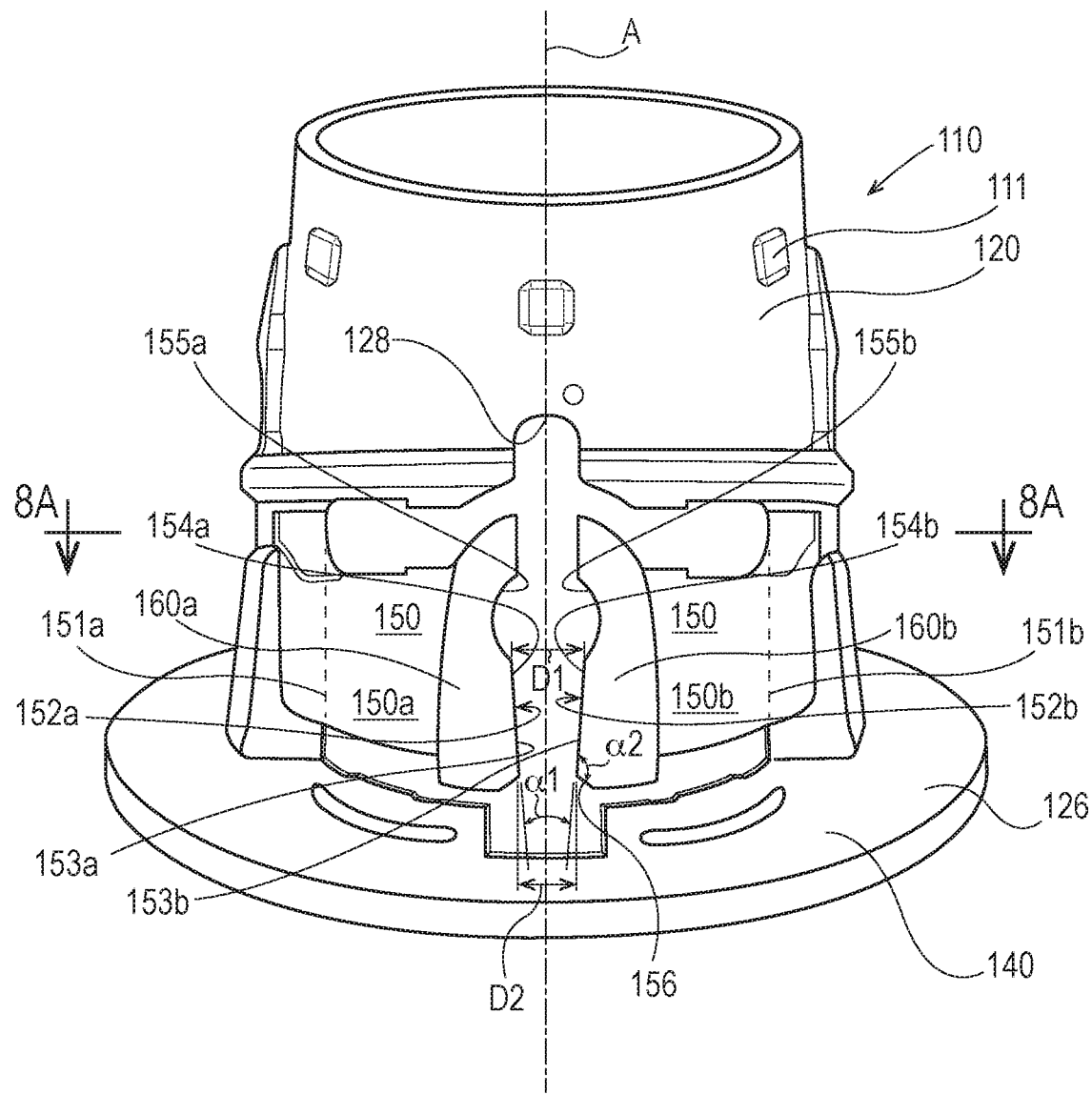
FIG. 8 is an enlarged schematic front view of an embodiment of the coupling insert shown in FIG. 6.

Each of the first and second coupling surfaces 153a, 153b comprises a slide portion 154 (154a, 154b) and a clamp portion 155 (155a, 155b) adjacent to the slide portion 154. A distance between mutually opposite a first slide portion 154a and a second slide portion 154b, of the first and second coupling surfaces 153a, 153b, respectively, can be from about 0.4 mm to about 5 mm, from about 0.5 mm to about 4.5 mm, and from about 0.6 mm to about 3 mm. In one particular embodiment, the distance between the two mutually opposite first slide portion 154a and second slide portion 154b is between about 1 mm and about 2 mm. This distance can be measured as an average of a maximal distance D1 and a minimal distance D2, as is shown in FIG. 8, when the refill 30, having the coupling device 100 therein, is not attached to the handle 20, i.e., when the coupling device 100 is not experiencing elastic deformation, as described herein.

In embodiments in which the coupling pin 230 is generally cylindrical, a diameter of the pin 230 (or an equivalent dimension orthogonal to the slide portions if the pin is not cylindrical) can be from about 0.8 mm to about 6 mm, from about 1 mm to about 5 mm, and from about 2 mm to about 4 mm. The mutually opposite clamp portions 155a, 155b of the coupling surfaces 153a, 153b, respectively, can beneficially match, in shape and size, the outer surface of the coupling pin 230.

The coupling surfaces 153 are structured and configured to slidably and resiliently by virtue of resiliency of the cantilever arms 150 engage the coupling pin 230 when the refill 30 is being axially attached to the handle 20, i.e., when the refill 30 is being axially moved relative to the handle 20 and the coupling stem 200 having the coupling pin 230 arranged thereon. During the axial attachment, the coupling pin 230 contacts the mutually opposite slide portions 154 of the coupling surfaces 153 at the pin's opposite sides as the pin 230 slides upwardly, in a resilient contact with the slide portions 154. When the pin 230 reaches the clamp portion 155, the pin 230 is pulled into a snap fit with the clamp portions 155a, 155b. To conveniently position the pin 230 relative to the mutually opposite coupling surfaces 153 and to facilitate the pin's entry into the space between the two coupling surfaces 153, each of the slide portions 154 may include a chamfer 156. An angle α2 formed between a surface of the chamfer 156 and the slide portion 154 can be, e.g., from about 100 degrees and 170 degrees, from about 110 degrees and about 160 degrees, and from about 120 to about 150 degrees.

At least one of the slide portions 154 can be angled relative to the longitudinal axis A. In the embodiments shown in FIGS. 4 and 8, both slide portions 154 are symmetrically angled relative to the longitudinal axis A such that the space between the mutually opposite slide surfaces 154 increases upwardly, i.e., the space between the first slide portion 154a and the second slide portion 154b increases in the direction from the chamfers 156 to the clamp portion 155. Such a configuration facilitates pulling of the pin 230 into the clamp portion 155 of the coupling surfaces 153, due to the resilience of the cantilevered arms 150 and an associated pressure of the coupling surfaces 153 acting on the coupling pin 230 as the pin 230 slides along the slide portions 154 towards the clamp portion 155. An included angle α1 formed between the two opposite slide portions 154a, 154b of the cantilevered arms 150 can be from about 0.1 degree to about 20 degrees, from about 1 degrees to about 15 degrees, and from about 1.5 degrees to about 10 degrees. In one particular embodiment, the angle α1 is from about 2 degrees to about 3 degrees. In another embodiment, the slide portions 154 of the first and second coupling surfaces 153 can be arranged substantially parallel to the longitudinal axis A, and hence substantially parallel to one another, FIG. 9 (showing a distance D3 between the two slide portions 154a, 154b).

An alternative embodiment (not shown), in which the slide portions 154 are oppositely angled relative to the longitudinal axis A, wherein the space between the two slide surfaces 154a, 154b decreases upwardly, i.e., the space between the first slide portion 154a and the second slide portion 154b decreases in the direction from the chamfers 156 to the clamp portion 155, is also contemplated in the present invention.

When the refill 30 is being attached to the handle, a space or clearance existing between the two mutually opposite coupling surfaces 153 of the cantilevered arms 150 resiliently expands—as the coupling pin 230 slides along the opposite slide portions 154 of the coupling surfaces 153. When this happens, the elastic (or resilient) deformation or movement of the cantilevered arms 150 may include a radial-bending elastic deformation, i.e., a resilient movement of the arms 150 away from the toothbrush's longitudinal axis A; an axial-bending elastic deformation, i.e., a resilient movement of the arms 150 along the toothbrush's longitudinal axis A; a torsion-twisting elastic deformation, i.e., a resilient torque movement of the cantilevered arm 150 wherein the coupling surface 153 rotates relative to the arm's fixed end or "root" (from which the arm 150 extends); and any combination thereof.

Because of repeated attachments and dis-attachments of the refill 30 to and from the handle 20, there is an inevitable wear at the interface of the coupling pin 230 and the coupling surfaces 153, particularly in an environment likely containing abrasive material such as toothpaste slurry. It is therefore beneficial to have the coupling pin 230 (which is part of the handle 20) made of steel or other hard-surface, wear-resilient materials (e.g., steel, ceramics, surface-reinforced plastic, and various suitable surface-coated materials), and the coupling surfaces 153 (which are part of the refill 30) made of plastic. Such an arrangement beneficially meets the requirements of functionality and the respective expected longevities of the handle 20 and the refill 30.

The clamp portion 155 of each of the first and second coupling surfaces 153 can be structured and configured to abut a side surface of the coupling pin 230 such that substantially an entire surface of the clamp portion 155 is in contact with the side surface of the coupling pin 230 when the refill 30 is attached to the handle 20. In other words, the respective surfaces of the pin 230 and the clamp portions 155 can be sized and shaped such that virtually the entire clamp portion 155 of each of the first and second coupling surfaces 153a, 153b is in contact with the corresponding surface of the pin 230, to provide a secure engagement between the handle 20 and the refill 30 when the refill 30 is attached to the handle 20.

The pin 230 may have any suitable shape, e.g., cylindrical, prismatic, conical, and others, although the cylindrical or conical shape may be preferred. Correspondingly, the clamp portions 155 of the coupling surfaces 153 can also be profiled to have a circular or semi-circular shape, wherein a diameter of the pin 230 is substantially equal to an equivalent diameter of the clamp portion 155. In such an arrangement, the entire surface of the clamp portion 155 will be in contact with the side surface of the coupling pin 230, as is described above. Since the two mutually opposite coupling surfaces 153, contacting the coupling pin 230, may have a space therebetween and thus may not comprise a perfect circle, the term "equivalent diameter," as used herein, refers to an imaginary or theoretical diameter of that the clamp portions 155 based on radii of their respective curvatures.

Figure 6:
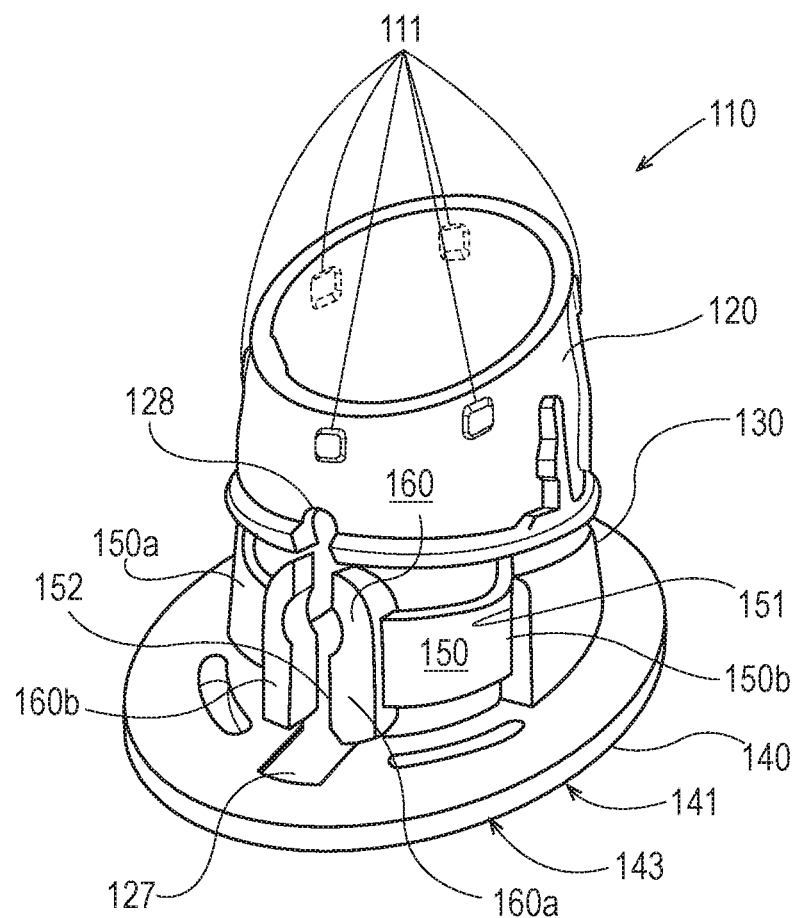
FIG. 6 is a schematic axonometric view of a coupling insert shown as part of the coupling device in FIG. 4.
Figure 7:
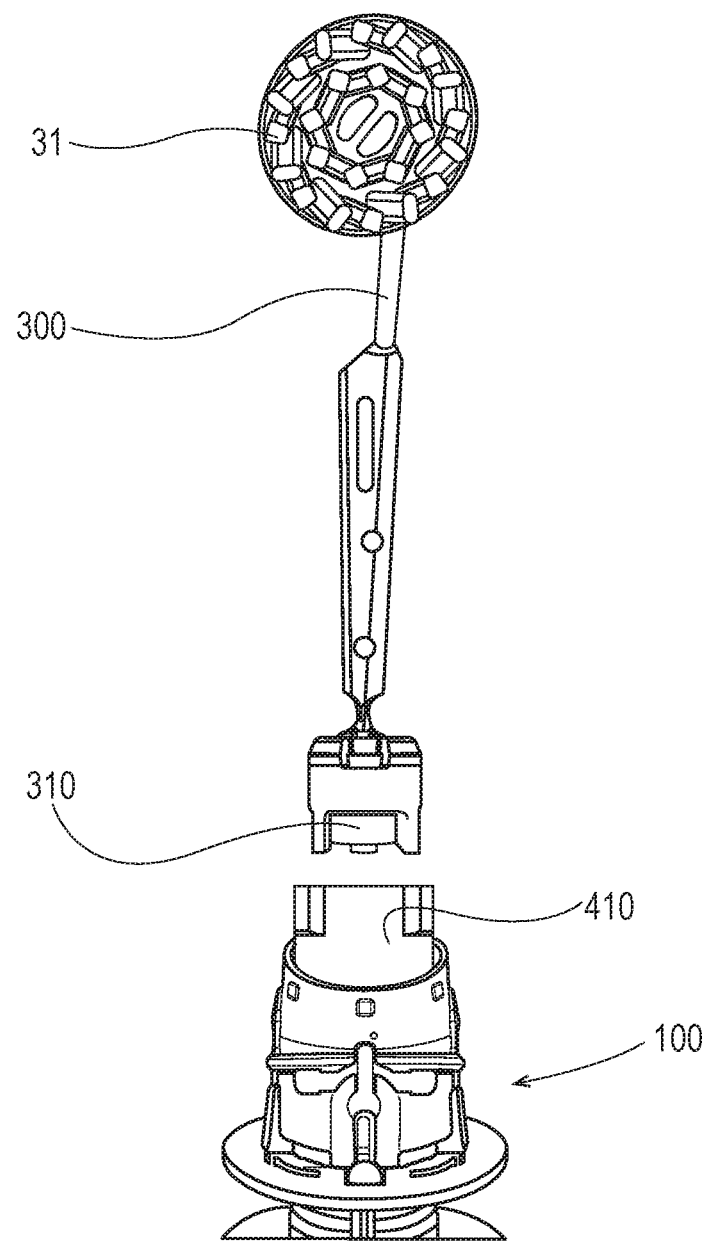
FIG. 7 is a schematic front view of a fragment of a toothbrush including the coupling device of the disclosure, showing a motion transmitter with a magnetic element for connecting the motion transmitter to a corresponding magnetic element of the handle.

The refill 30, and the coupling mechanism 100, can be structured to comprise a coupling insert 110 disposed inside the tubular portion 33 of the refill 30 and fit-pressed thereto, e.g., by utilizing a plurality of press-fit segments 111. One exemplary embodiment of such press-fit segments, comprising protrusions 111 from the insert's outer surface, is schematically shown in FIG. 6. In a further embodiment, the protrusions 111 can have corresponding segments, e.g., corresponding depressions (not shown) disposed on the inner side of the tubular portion 33 of the refill 30. The press-fit segments can be distributed equidistantly, e.g., at 60 degrees, from one another around the interface perimeter between the tubular portion 33 and the insert 110.

Figure 8A:
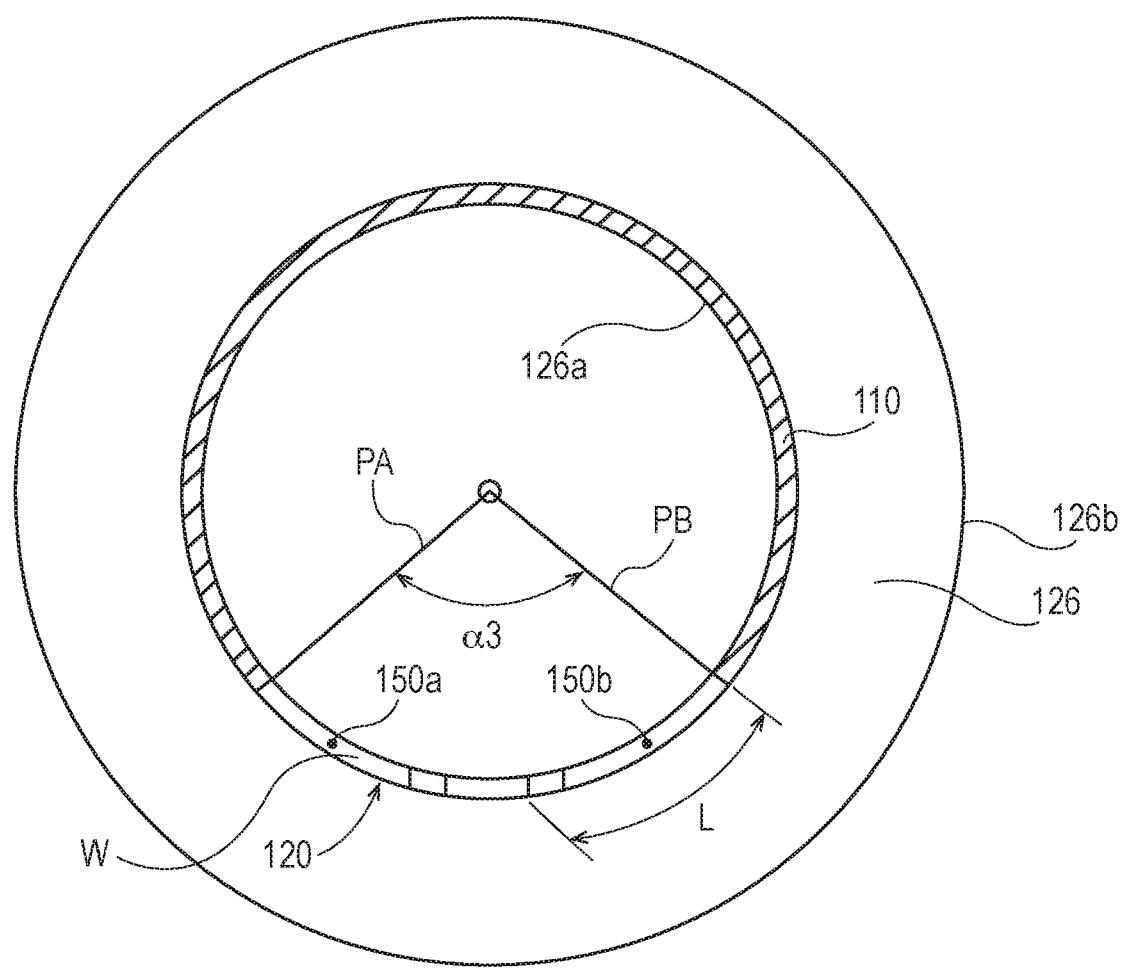
FIG. 8A is a schematic cross-sectional view, taken along lines 8A-8A, of the coupling insert shown in FIG. 8.
Figure 9:
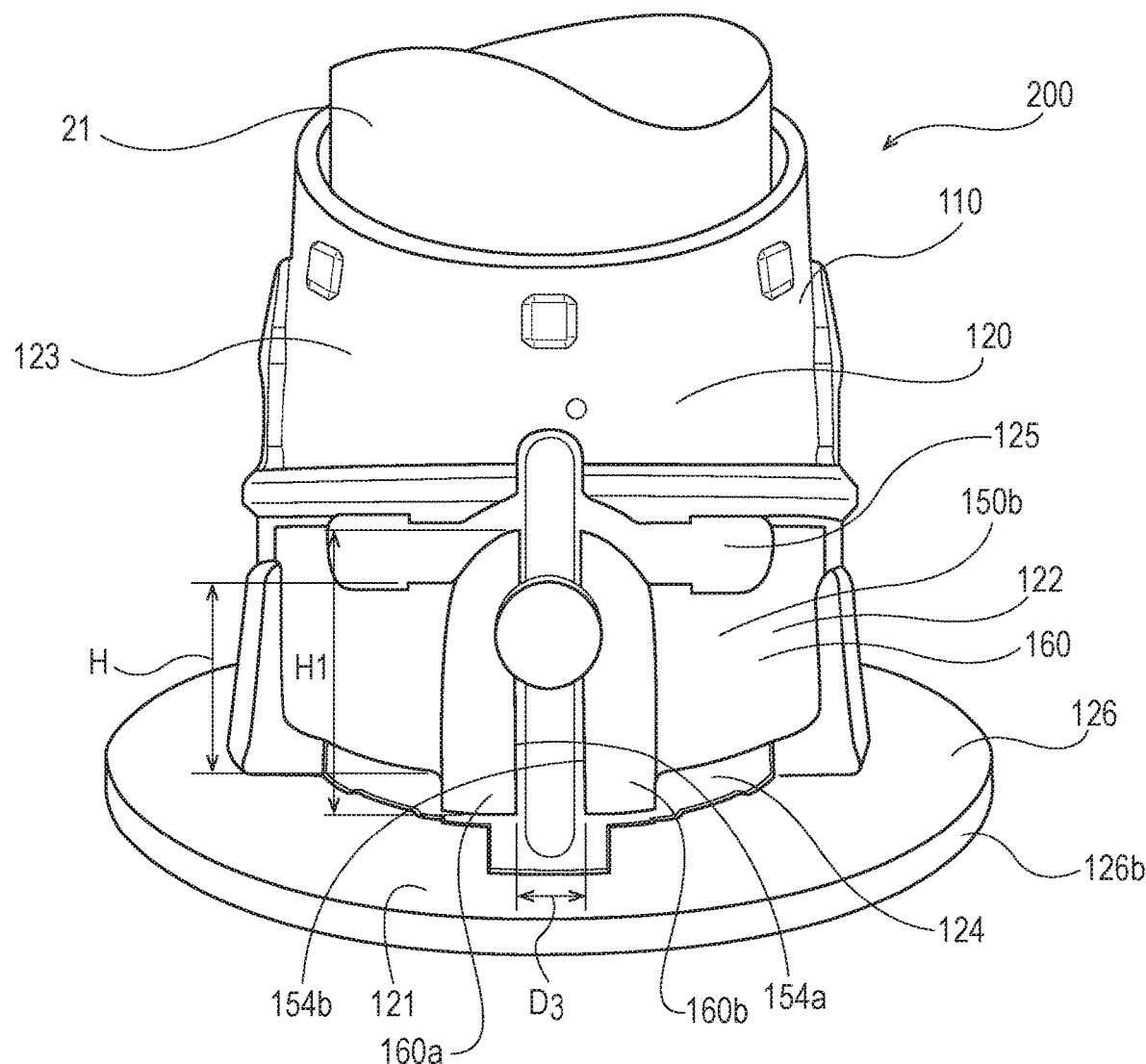
FIG. 9 is an enlarged schematic front view of an embodiment of a coupling device shown in FIG. 4.
Figure 9A:
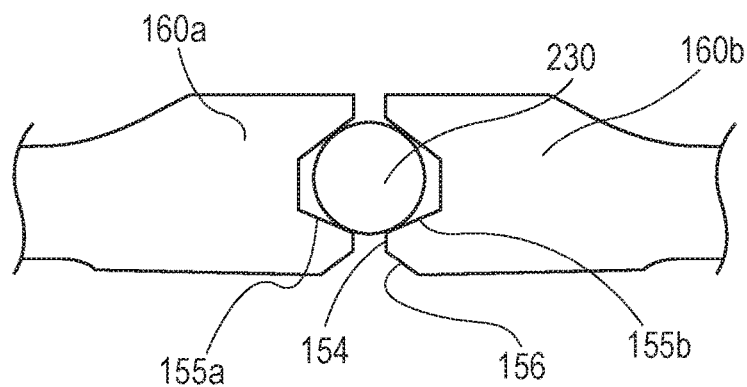
FIG. 9A is an enlarged fragmental view of another embodiment of a coupling device.

As is best shown in FIGS. 9 and 8A, the insert 110 can have a front segment 120 comprising a lower section 121, an upper section 123, and a middle section 122 intermediate the lower section 121 and the upper section 123. The lower section 121 is separated from the middle section 122 by a first semi-circular space 124, and the middle section 122 is separated from the upper section 123 by a second semi-circular space 125. As used herein, the front segment 120 of the insert 110 is the insert's semi-circular portion that includes both cantilevered arms 150a, 150b in their entirety, from the first end 151a of the first arm 150a to the first end 151b of the second arm 150b. In plan view of FIG. 8A, the front segment 120 is outlined by an included angle α3, formed in a plan-view of the insert 110 between two planes PA and PB parallel to a longitudinal axis A, which angle can be from about 70 degrees to about 200 degrees, from about 80 degrees to about 190 degrees, and from about 90 degrees to about 180 degrees.

The lower section 121 of the coupling insert 110 may comprise an annular flange 126 extending in a direction substantially perpendicular to the longitudinal axis A and comprising an inner perimeter 126a and an outer perimeter 126b. When the refill 30, having the coupling insert 110 incorporated therein, is securely attached to the handle 20, the annular flange 126 can be positioned adjacent to the handle 20, FIG. 4. The flange 126 may beneficially include, adjacent to its inner perimeter 126a, a recess 127 sized and shaped to provide a space for the rib 240 and the pin 230 of the coupling stem 200 when the refill 30 is being axially attached to the handle 20.

The middle section 122 includes the pair of mutually opposite cantilevered arms 150, previously described. The cantilevered arms 150 are positioned such that they can resiliently move, as previously described, relative to the lower section 121 and the upper section 123 of the coupling insert 110. The upper section 123 may include the groove 128, previously described, for engaging the upper end 242 of the rib 240 outwardly projecting and longitudinally extending from the coupling stem 200, to restrict radial and/or axial movement of the refill 30 relative to the handle 20 when the refill 30 is being axially attached to the handle 20.

Figure 10:
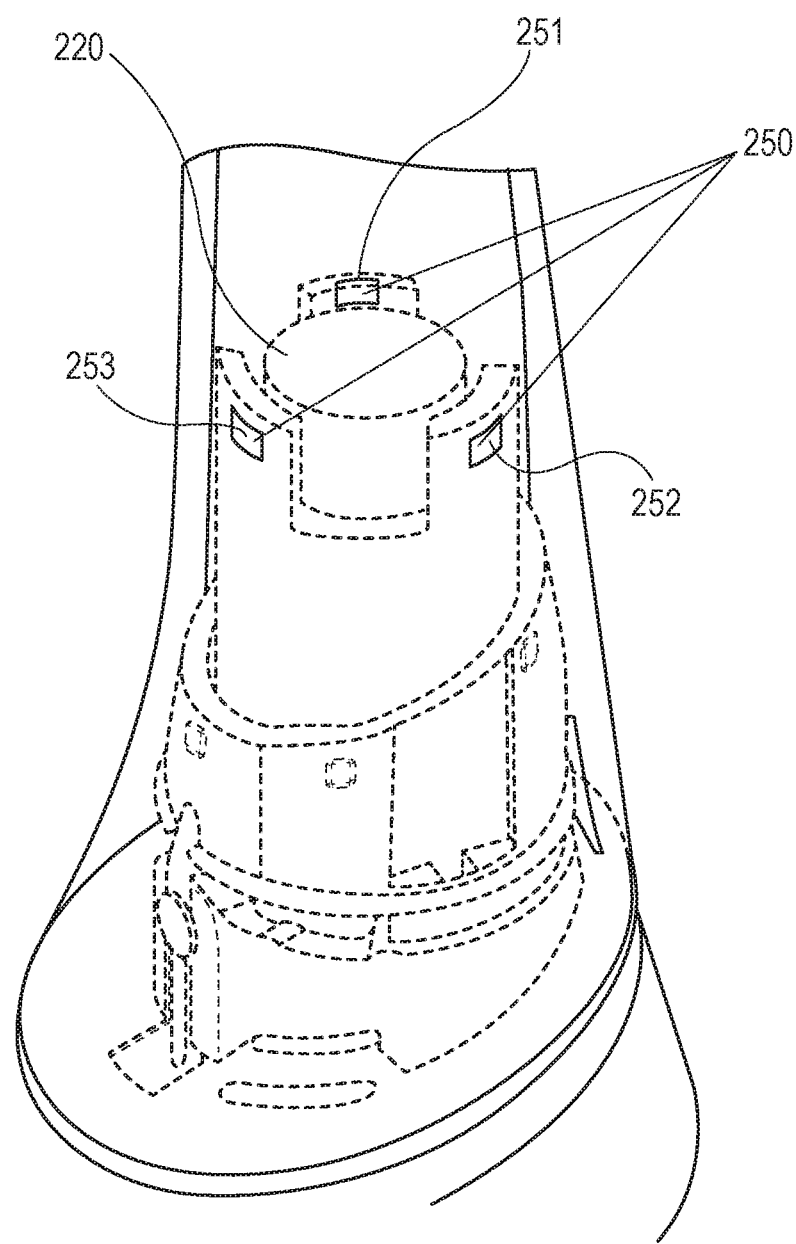
FIG. 10 is a schematic axonometric view of an embodiment of the coupling device, showing press-fit segments for connecting the stem to the handle.
Figure 11:
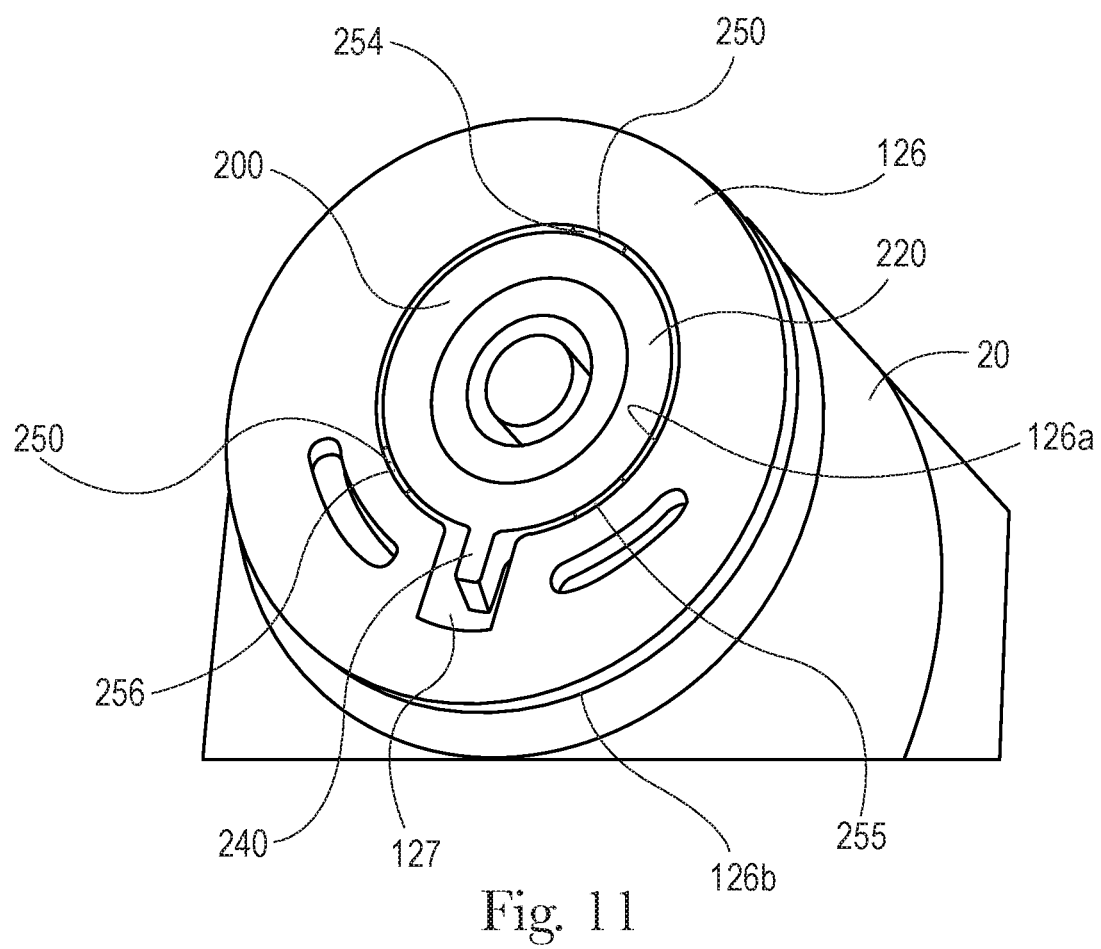
FIG. 11 is another schematic axonometric view of an embodiment of the coupling device, showing press-fit segments for connecting the stem to the handle.

To ensure a secure connection between the refill 30 and the handle 20, the outer walls 210 of the coupling stem 200 and the refill walls can be constructed to form, in combination, a plurality of press-fit segments 250 wherein respective opposite faces of the outer walls 210 and the refill walls frictionally engage one another when the refill 30 is attached to the handle 20. Press-fit segments 250, frictionally uniting the refill 30 and the stem 200, can be provided at any suitable location, e.g., adjacent to the free end 220 of the coupling stem 200 and/or adjacent to an end opposite to the free end 220 of the coupling stem 200. As is shown in FIG. 10, e.g., the plurality of press-fit segments 250 may comprise at least three (upper) press-fit segments 251, 252, 253 adjacent to the free end 220 of the coupling stem 200. The plurality of press-fit segments 250 may further include at least three (lower) press-fit segments 254, 255, 256 adjacent to the end opposite to the free end 220 of the coupling stem 200. The (lower) press-fit segments 254, 255, 256 can beneficially comprise portions of the inner perimeter 126a of the flange 126 of the coupling insert's lower section 121, as is best shown in FIG. 11.

Figure 13:
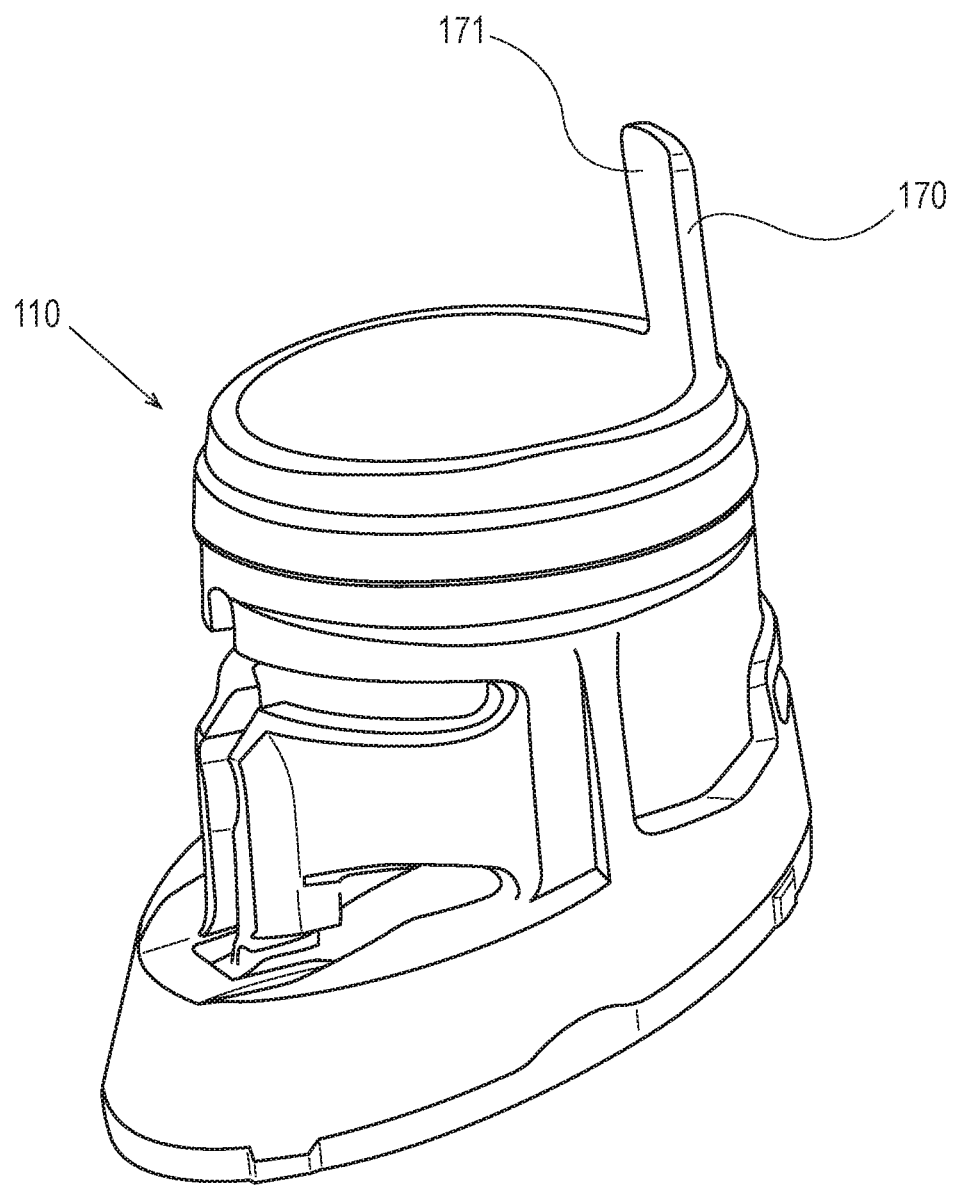
FIG. 13 is a schematic axonometric view of an embodiment of a coupling insert having a tolerance-compensation spring.
Figure 14:
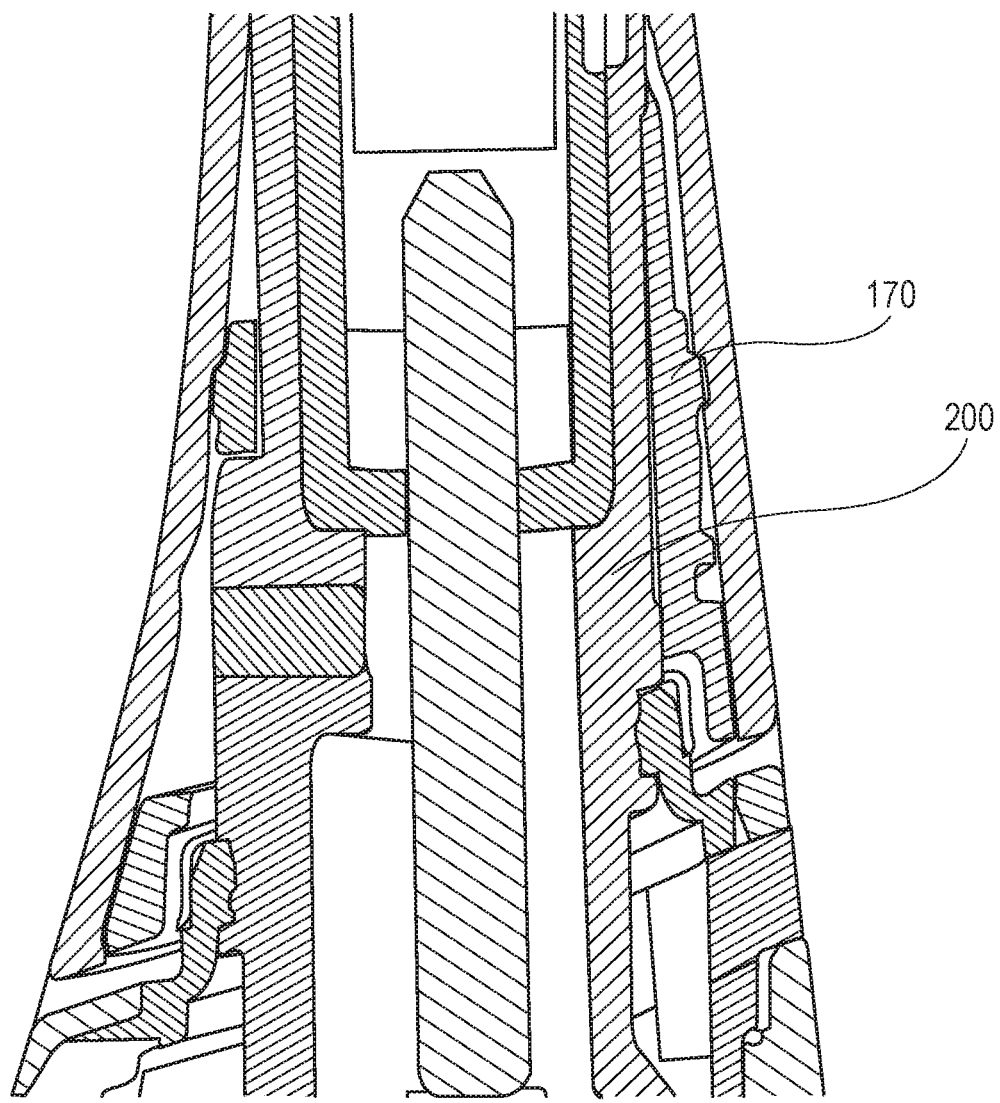
FIG. 14 is a schematic cross-sectional side view of an embodiment of a coupling device, including the coupling insert having a tolerance-compensation spring resiliently abutting the coupling stem of a handle.

In another embodiment, schematically shown in FIGS. 13 and 14, the coupling insert 110 comprises a tolerance-compensation spring 170 extending upright in a general direction substantially parallel to the longitudinal axis A. The tolerance-compensation spring 170 can be beneficially formed (e.g., molded) is an integral part of the coupling insert. The tolerance-compensation spring 170 has a free end and an inner surface 171. The tolerance-compensation spring 170 is structured and configured so that when the refill 30 is attached to the handle 20, at least an upper portion of the tolerance-compensation spring's inner surface 171 (that is, the inner surface's portion adjacent to the free end of the tolerance-compensation spring 170) resiliently abuts the adjacent surface of the coupling stem 200, thereby providing a frictional fit-press connection therebetween. Although a single tolerance-compensation spring 170 is illustrated herein, embodiments comprising two or more tolerance-compensation springs of this or a similar construction are contemplated by this disclosure.

In a further embodiment, each of the cantilevered arms 150 may comprise a curved portion 160 and a fin 160a, 160b integrally formed with the curved portion 160 (FIG. 9). The fin can be generally vertically oriented. The fin 170 includes the coupling surface 153, previously described. The curved portion 160 has a curvature length L measured in a circumferential direction, a curvature height H measured at the highest (tallest) portion of the curved portion 160 in a direction generally perpendicular to the curvature length L, and a curvature thickness W measured in a direction generally perpendicular to the curvature height H, wherein the curvature length is greater than the curvature height H and the curvature height H is greater than the curvature thickness W. Given a certain plastic material of the cantilevered arms 150, e.g., polyoxymethylene (POM) or reinforced POM, having beneficial physical properties, these dimensions L, W, and H, can be carefully chosen to facilitate the elastic deformation of the cantilevered arms 150. As previously described, such deformation may include at least one of a radial-bending elastic deformation, i.e., an outward resilient "unbending" movement of the arms 150 away from the longitudinal axis A; an axial-bending elastic deformation, i.e., a resilient movement of the arms 150 substantially along the longitudinal axis A (i.e., up-and-down movement); a torsion-twisting elastic deformation, i.e., a resilient torque movement of the cantilevered arms 150 wherein the coupling surface 153 rotates relative to the arm's fixed end (or "root") 151, from which the arm 150 extends; and any combination thereof.

The vertical fin 160a, 160b has a fin height HE As is shown in several Figures, the fin height H1 can (but does not have to) be greater than the curvature height H. In one exemplary non-limiting embodiment, the curvature length can be from about 4 mm to about 10 mm, from about 4.5 mm to about 9 mm, and from about 5 mm to about 8 mm. The curvature height can be from about 2 mm to about 8 mm, from about 2.5 mm to about 6.5 mm, and from about 3 to about 5 mm. The curvature thickness can be from about 0.5 mm to about 2 mm, from about 0.7 mm to about 1.8 mm, and from about 0.9 mm to about 1.6 mm. The fin height can be from about 3 mm to about 12 mm, from about 5 mm to about 10 mm, and from about 6 mm to about 9 mm.

The refill 30 may include a motion transmitter 300 therein. In one embodiment, the motion transmitter 300 terminates with a first magnetic coupling element 310, while a drive mechanism of the handle 20 terminates with a second magnetic coupling element 410, FIG. 7. Then, the first magnetic coupling element 310 and the second magnetic coupling element 410 can be structured and configured to form a secure magnetic connection therebetween when the refill 30 is attached to the handle 20, so that the movement of the handle's drive mechanism is effectively transmitted to the refill's motion transmitter 300. Such magnetic coupling elements may include permanent magnet or magnets and/or a magnetizable element or elements, as is described in the commonly assigned U.S. Pat. No. 8,631,532, the disclosure of which incorporated herein by reference.

The drive mechanism of the handle 20 can be structured and configured for a linear oscillatory movement substantially along the longitudinal axis A, while the brush head 31 can be structured and configured for a rotational oscillatory motion around a rotation axis X extending substantially perpendicular to the longitudinal axis A, a lateral oscillatory motion around an axis extending substantially parallel to the longitudinal axis A, or any other type of movement, including a linear oscillatory movement, or vibratory action, and other movement patterns, as is known in the art.

While particular embodiments have been illustrated and described herein, various other changes and modifications may be made without departing from the spirit and scope of the invention. Moreover, although various aspects of the invention have been described herein, such aspects need not be utilized in combination. It is therefore intended to cover in the appended claims all such changes and modifications that are within the scope of the invention.

The terms "substantially," "essentially," "about," "approximately," and the like, as may be used herein, represent the inherent degree of uncertainty that may be attributed to any quantitative comparison, value, measurement, or other representation, as one skilled in the art will readily appreciate. These terms also represent the degree by which a quantitative representation may vary from a stated reference without resulting in a change in the basic function of the subject matter at issue. Further, the dimensions and values disclosed herein, whether or not preceded by the terms "substantially," "essentially," "about," "approximately," and the like, are not to be understood as being strictly limited to the exact numerical values recited. Instead, unless otherwise specified, each such dimension is intended to mean both the recited value and a functionally equivalent range surrounding that value. For example, values disclosed as "5 mm" and "70 degrees" are intended to mean "about 5 mm" and "about 70 degrees" respectively.

The disclosure of every document cited herein, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein—or that it alone, or in any combination with any other reference or references, teaches, suggests, or discloses any such invention. Further, to the extent that any meaning or definition of a term in this document conflicts with any meaning or definition of the same or similar term in a document incorporated herein by reference, the meaning or definition assigned to or contextually implied by that term in this document shall govern.

What is claimed is:

1. A refill for an electric toothbrush having a longitudinal axis, the refill having a movable brush head and being structured and configured to be attached to a handle of the electric toothbrush, the refill comprising a generally tubular structure formed by refill walls defining an interior space for accepting thereinto a coupling stem of the handle, wherein the refill includes a motion transmitter functionally connected to the brush head for driving the brush head, wherein the refill comprises a coupling device comprising a pair of mutually opposite cantilevered arms disposed in the interior space of the refill and adjacent to the refill walls, wherein each of the arms is resiliently deformable and terminates with a coupling surface structured and configured to engage a coupling pin extending from the coupling stem of the handle for secure and disengageable connection therewith, wherein the refill includes a coupling insert having a front segment comprising an upper section, a lower section, and a middle section between the upper and lower sections, wherein the lower section is separated from the middle section by a first semi-circular space and the middle section is separated from the upper section by a second semi-circular space, wherein the lower section is adjacent to the handle when the refill is attached thereto, wherein the middle section comprises the pair of mutually opposite cantilevered arms, and wherein the upper section comprises a groove structured and configured to engage an upper end of a rib longitudinally extending from a neck of the handle thereby restricting axial movement of the refill relative to the handle when the refill is being axially attached to the handle.

2. The refill of claim 1, wherein the coupling surfaces of the cantilevered arms are structured and configured to engage the coupling pin that extends from the coupling stem of the handle in a direction substantially perpendicular to the longitudinal axis.

3. The refill of claim 1, wherein the coupling surfaces of the cantilevered arms are structured and configured to engage the coupling pin that extends from the coupling stem intermediate a lower end and an upper end of the rib extending from the coupling stem in a direction substantially perpendicular to the longitudinal axis and lengthwise oriented substantially parallel to the longitudinal axis.

4. The refill of claim 1, wherein the pair of mutually opposite cantilevered arms terminating with coupling surfaces comprises a first cantilevered arm terminating with a first coupling surface and a second cantilevered arm terminating with a second coupling surface opposite to and facing the first coupling surface, and wherein the first and second coupling surfaces are structured and configured to simultaneously embrace the coupling pin at opposite sides thereof when the refill is attached to the handle.

5. The refill of claim 4, wherein the first coupling surface and the second coupling surface are structured and configured to slidably and resiliently engage the coupling pin when the refill is being axially attached to the handle.

6. The refill of claim 5, wherein each of the first and second coupling surfaces comprises a slide portion and a clamp portion adjacent to the slide portion.

7. The refill of claim 6, wherein each of the slide portions includes a chamfer.

8. The refill of claim 6, wherein the slide portion of each of the first and second coupling surfaces is substantially parallel to the longitudinal axis.

9. The refill of claim 6, wherein the slide portion of each of the first and second coupling surfaces is angled relative to the longitudinal axis, and wherein an included angle between the slide portions is from about 0.1 degree to about 20 degrees.

10. The refill of claim 6, wherein the clamp portion of each of the first and second coupling surfaces is structured and configured to abut a side surface of the coupling pin such that substantially an entire surface of the clamp portion is in contact with the side surface of the coupling pin when the refill is attached to the handle.

11. The refill of claim 10, wherein the clamp portion of each of the first and second coupling surfaces is circular, having a diameter substantially equal to an equivalent diameter of the coupling pin.

12. The refill of claim 11, wherein the diameter of the coupling surface is from about 0.8 mm to about 6 mm.

13. The refill of claim 12, wherein a distance between the mutually opposite slide portions of the first and second coupling surfaces is from about 0.4 mm to about 5 mm.

14. The refill of claim 1, wherein the mutually opposite cantilevered arms are structured and configured to resiliently move relative to the lower section and the upper section of the insert.

15. The refill of claim 14, wherein a resilient movement of the cantilevered arms relative to the lower section and the upper section of the insert includes a movement selected from the group consisting of a radial-bending movement, an axial-bending movement, a torsion-twisting movement, and any combination thereof.

16. The refill of claim 1, wherein the refill walls are structured and configured to form, in combination with the outer walls of the coupling stem, a plurality of press-fit segments wherein opposite faces of said segments frictionally engage one another when the refill is attached to the handle.

17. The refill of claim 16, wherein the press-fit portions are provided at longitudinally opposite ends of the coupling device.

18. The refill of claim 17, wherein there are at least three press-fit segments at each of the opposite ends of the coupling device, the press-fit segments being substantially equidistantly spaced from one another.

19. The refill of claim 1, wherein the motion transmitter of the refill terminates with a first coupling element connected to the motion transmitter and structured and configured for establishing an operative connection with a second coupling element provided in the handle.

20. The refill of claim 19, wherein the first coupling element comprises a first magnetic element selected from the group consisting of a permanent magnet, a magnetizable element, or any combination thereof, suitable for establishing a magnetic connection with a second magnetic coupling element provided in the handle.

21. The refill of claim 1, wherein the motion transmitter is structured and configured for linear oscillatory movement substantially along the longitudinal axis.

22. The refill of claim 1, wherein the coupling insert comprises at least one tolerance-compensation spring outwardly extending in a general direction of the longitudinal axis, wherein the tolerance-compensation spring has a free end and is structured and configured so that when the refill is attached to the handle, at least a portion of the tolerance-compensation spring adjacent to its free end resiliently biases the coupling insert against the coupling stem, thereby providing a frictional press-fit contact therebetween.

23. A refill for an electric toothbrush having a longitudinal axis, the refill having a movable brush head and being structured and configured to be attached to a handle of the electric toothbrush, the refill comprising a generally tubular structure formed by refill walls defining an interior space for accepting thereinto a coupling stem of the handle, wherein the refill includes a motion transmitter functionally connected to the brush head for driving the brush head,
wherein the refill includes a coupling insert having a front segment comprising an upper section, a lower section, and a middle section disposed between the upper and lower sections, wherein the lower section is separated from the middle section by a first semi-circular space and the middle section is separated from the upper section by a second semi-circular space, wherein the lower section is adjacent to the handle when the refill is attached thereto,
wherein the middle section comprises a pair of mutually opposite cantilevered arms disposed in the interior space of the refill and adjacent to the refill walls, each of the arms being resiliently deformable and terminating with a coupling surface structured and configured to engage a coupling pin extending from the coupling stem of the handle for secure and disengageable connection therewith, and
wherein the upper section comprises a groove structured and configured to engage an upper end of a rib longitudinally extending from a neck of the handle thereby limiting axial movement of the refill relative to the handle when the refill is being axially attached to the handle.

* * * * *